United States Patent Office 3,579,470
Patented May 18, 1971

3,579,470
DIPHENYL OXIDE MODIFIED PHENOLIC RESIN INSULATING VARNISHES
Robert H. Runk, Pittsburgh, Pa., assignor to Westinghouse Electric Corporation, Pittsburgh, Pa.
No Drawing. Continuation of applications Ser. No. 394,312, Sept. 5, 1964, and Ser. No. 706,706, Feb. 19, 1968. This application Dec. 30, 1968, Ser. No. 800,313
Int. Cl. C08g 37/20
U.S. Cl. 260—20
14 Claims

ABSTRACT OF THE DISCLOSURE

Monomeric monofunctional chloromethyl diphenyl oxide and/or alkoxy methyl diphenyl oxide is reacted with a substantially equimolar amount of a phenol. The product is further reacted with formaldehyde to form a resole that that may be converted to a cross-linked polymer by the application of heat. The resole resins may be blended with modifying compositions such as epoxy esters and/or oil modified alkyds and the like.

---

This application is a continuation of application Ser. No. 706,706, filed Feb. 19, 1968 and application Ser. No. 394,312, filed Sept. 5, 1964, both now abandoned.

The present invention relates to synthetic resinous insulating varnishes. More particularly, the invention relates to resinous insulating varnishes prepared from diphenyl oxide monomers, phenols, and formaldehyde. The novel insulating varnishes are characterized by their exceptional resistance to heat and alkalies, and by their physical properties which range from rigid high strength to soft flexible types. The invention includes the novel insulating varnishes themselves, the method of their preparation, and articles insulated therewith.

For many years the phenolic resins have been employed in a multitude of uses. In particular, the phenolics have had wide application as varnishes, enamels, and the like uses. Their properties, including physical and electrical, have resulted in their acceptance by industry on a wider basis than any other synthetic resinous materials. As is the case with any of the resins, however, it has been necessary to modify the phenolics with other materials to enhance certain properties for specific applications.

Recently, as a result of the desire for resins exhibiting unusual thermal stability while maintaining their physical and electrical strengths, there has been developed a class of resins comprising polymers derived from diphenyl oxides. In general, these diphenyl oxide polymers may be defined by the formula:

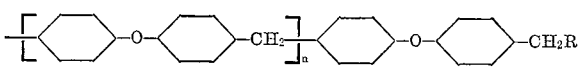

where R is halogen or an alkoxy radical having 1-4 carbon atoms and $n$ is an integer of from 1 to about 9. The polymers are prepared from starting materials such as monochloromethyl diphenyl oxide, monomethoxy methyl diphenyl oxide, and the like diphenyl oxide monomers. The monomeric diphenyl oxides are heated in the presence of a suitable catalyst until the desired viscosity is attained. Thereafter, the intermediate product is applied as a varnish and cured by heat to thermoset condition. When applied as electrical insulation, as for example over electrical conductors, the polymers are outstanding in their retention of physical and electrical properties at elevated temperatures. The thermoset polymers, however, are somewhat brittle and require high temperature curing conditions which have limited, to a degree, their use in some applications.

It is an object of the present invention to provide a novel class of resinous compositions characterized by outstanding electrical properties and thermal stability by the coreaction of diphenyl oxide monomers and phenols and formaldehyde.

Another object of the invention resides in the provision of a novel class of insulating varnishes from diphenyl oxide-phenols-formaldehydre employed in conjunction with other resinous compositions to afford insulation ranging from rigid high strength to soft flexible types.

Other objects of the invention will, in part, be obvious, and in part, become apparent from the following detailed description thereof.

Generically, the novel resinous compositions are prepared by reacting substantially equimolar proportions of a monomeric substituted diphenyl oxide and a phenol by heating the components. The diphenyl oxide substituted phenol is thereafter converted to a resole by reaction with a stoichiometric excess of a formaldehyde. The reactions may be presented graphically as follows: The radical R is halogen or lower alkoxy.

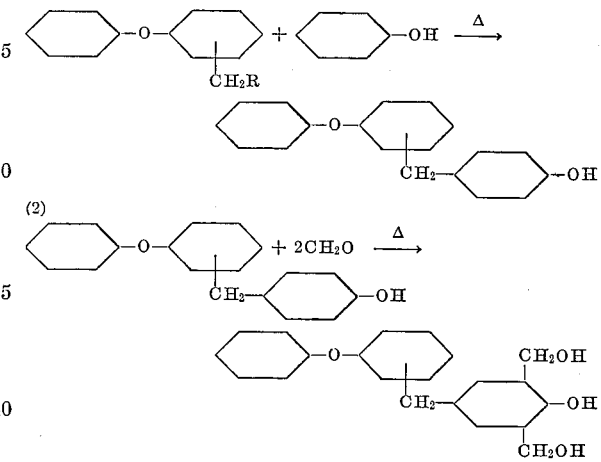

The resole is converted to a cross linked polymer by the application of heat. It has been discovered that these polymers and their blends with heat resistant alkyds and epoxy resin esters exhibit sufficient resistance to thermal oxidation in the AIEE #57 dielectric twist test over Class H enameled wire that they may be considered as Class H electrical insulating varnishes. Furthermore, since they range in hardness from soft and flexible to rigid, depending on the amount and type of blending resin, they are applicable over the entire range of the various types of insulating varnishes. The novel insulating resins may, as well, be applied to tapes, wrappers, and the like materials to provide outstanding electrical insulation.

As stated hereinbefore, the starting materials are monomeric substituted diphenyl oxides and phenols. The diphenyl oxides include monochloromethyl diphenyl oxide (hereinafter referred to as CMDPO), and alkoxymethyl diphenyl oxides in which the alkoxy group may contain 1 to 4 carbon atoms. It should be understood that the monomeric diphenyl oxide compounds may contain an average of about one substituent group for each diphenyl oxide moiety. Typical monomers may include monomethyoxymethyl diphenyl oxide (MMDPO), monoethoxymethyl diphenyl oxide (MEDPO), monopropoxymethyl diphenyl oxide (MPDPO), and monobutoxymethyl diphenyl oxide (MBDPO). The chloromethyl DPO has been known for many years and is readily available commercially. The alkoxymethyl DPO monomers are also available commercially. Chemically, they are prepared according to the well known Williamson synthesis by the reaction of the halomethyl DPO with a suitable metal alhoholate.

The phenols employed as starting materials include phenol itself and substituted phenols such as 2,2-bis-(4-hydroxy phenyl) propane (Bisphenol-A), p-tert butyl phenol, para cresol, nonyl phenol, polymethylene polyphenol (such as Flexiphen 160, marketed by Koppers Co., Inc.), and the like.

The reaction of monomeric diphenyl oxide and phenol is effected by simply mixing substantially equimolar proportions thereof and heating the mixture at about 75–250° C. under reflux until the reaction is complete. The reaction is followed by noting either the evolution of halogen or alcohol depending on the starting DPO monomer until completion of the reaction.

The reaction of this intermediate with formaldehyde is carried out by heating the materials, preferably in a solvent medium, at 50° C.–110° C. Suitable solvents include a mixture of methanol and toluene, ethylene glycol monoethyl ether (Cellosolve), and similar well known organic solvents.

In blending the DPO-phenol formaldehyde resins with modifying compositions such as epoxy esters and/or oil modified alkyds, polyesters, and the like, there is usually employed about one part by weight of the above described resins and from one to three parts by weight of the modifying compositions. The so-prepared insulating varnish compositions are ordinarily applied as about 40% to about 70% solids varnishes.

The invention will be further particularized by the following examples. It is to be understood, however, that the examples are given for the purpose of illustration only.

EXAMPLE 1

Phenoxy benzylphenol formaldehyde resin
(via monochloromethyl diphenyloxide+phenol)

(A) PREPARATION OF INTERMEDIATE

Charge:
219 gms. (1 mol) CMDPO
94 gms. (1 mol) reagent grade phenol

The above materials were charged into a 1 liter 3 neck flask equipped with stirrer, thermometer, inert gas bubbling tube and inert gas exit tube connected to a scrubber bottle containing aqueous 2 N $K_2CO_3$. The reaction mixture was warmed to about 50° C. when reaction became evident by evolution of HCl. At this point dry $N_2$ was introduced through the gas inlet tube to aid in sweeping out the HCl and sweeping was continued at the rate of 0.1 to 0.2 l./min. throughout the reaction.

After 45 minutes at 50° C. the temperature was gradually elevated to 170° C. during the period of 2½ hours, and maintained at 170°–180° C. for an additional period of 16 hours until the product showed only a faint trace of positive halogen by the Beilstein copper wire test.

The HCl collected during the entire reaction was neutralized by reaction with the known excess of 2 N $K_2CO_3$ solution in the scrubber bottle and thus the degree of reaction could be determined by titration. By this procedure 37.4 gms. of HCl were recovered, slightly in excess of the theoretical quantity.

(B) PREPARATION OF FORMALDEHYDE CONDENSATION RESIN

Charge:
271 gms. (about 1 mol) phenoxy benzylphenol from A above
31.5 gms. (1.05 mol) paraformaldehyde
0.4 gm. (0.01 mol) sodium hydroxide (catalyst)
15 gms. methanol-solvent medium
200 gms. toluene-solvent medium The above materials were weighed into a 1 l. 3 neck flask equipped with stirrer, thermometer and reflux condenser. The temperature was raised gradually to 110° C. and after the solution became clear, refluxing was continued at 95°–190° C. for 1½ hours. At this point the solution was clear except for a fine crystalline precipitate.

Water was then removed by azeotropic distillation with a Dean-Stark trap. Distillation was continued until all water and 150 gms. of toluene had been removed. The latter solvent was replaced with 150 gms. of ethylene glycol monoethyl ether (Cellosolve). The solution was clarified by vacuum filtration and adjusted to approximately 50% solids with Cellosolve toluene (2:1).

A sample of the clear amber varnish was baked to a tough hard gel in 30 minutes at 150° C. (forced draft oven).

Compatibility tests on gelled samples revealed that this phenolic resin is compatible with nonoil modified alkyds and polyester resins.

EXAMPLE 2

(A) Preparation of intermediate, phenoxy benzylphenol
(via methoxy methyldiphenyloxide and phenol)

Charge:
215 gms. (1 mol) methoxy methyl diphenyloxide
94 gms. (1 mol) reagent grade phenol The above materials were charged into a 1 l. 3 neck flask equipped with stirrer, thermometer and a Vigreaux fractioning column and receiver. Heat was applied until the reaction mixture reached 170° C. where distillation began at the top of the column with the distillate vapor temperature registering 70° C. Heating was continued for three hours with the flask temperature gradually rising to 250° C. and the distillate vapor temperature rising to 80° C. At this point reaction was stopped with the resulting yield of 30 grams of recovered distillate (methanol) indicating 94% completion of reaction.

The product closely resembled that of Example 1–A.

(B) Preparation of formaldehyde condensate resin

The phenol formaldehyde resin from the above intermediate was prepared by the procedure outlined in Example 1–B, using the same quantities. The resin exhibited properties similar to that prepared under Example 1–B.

EXAMPLE 3

Phenoxy benzyl substituted Bisphenol-A formaldehyde resin (via chloromethyldiphenyloxide)

(A) PREPARATION OF INTERMEDIATE, PHENOXYBENZYL SUBSTITUTED BISPHENOL-A

Charge:
219 gms. (1 mol) chloromethyldiphenyloxide
228 gms. Bisphenol-A

The same general procedure and apparatus was used as in preparation of phenoxy benzylphenol via the chloromethyl diphenyl oxide route (Example 1–A). Total reaction time was 5 hours. Temperature of the reacting mass was scheduled as follows: ½ hour 75° C.–100° C.; 1 hour 100° C.–110° C.; ½ hour 110° C.–130° C.; ½ hour 130° C.–155° C.; 2½ hours at 155° C.

Reaction was followed by titration of 1N.$K_2CO_3$ in the gas scrubbing bottle until 99+% completion. At the expiration of 5 hours reaction time a drop of condensate was tested by the Beilstein copper wire test indicating negative for residual chlorine.

The end product was a dark brown semisolid resinous mass.

(B) PREPARATION OF PHENOLIC RESIN FROM PHENOXYBENZYL SUBSTITUTED BISPHENOL-A

Charge:
410 gms. (1 mol) intermediate from above
63 gms. (2.10 mols) paraformaldehyde
0.8 gm. (0.02 mol) NaOH
30 gms. methanol
400 gms. toluene The materials were charged into a 2 liter 3 neck flask. Preparation of the resin was similar to the preparation of the phenol analog described in Example 1–B. Refluxing temperature was 95°–100° C.

In the final distillation 240 gms. of toluene was removed causing the resin to increase in molecular weight and viscosity. The toluene was replaced by 240 gms. of monoethyl ether of ethylene glycol (Cellosolve) to form a clear resin solution with a small amount of a purple crystalline precipitate. The precipitate was removed by filtering under vacuum.

The product was a clear orange colored resin varnish which gelled in 30 minutes at 135° C. in a forced draft oven. The resin varnish is compatible with short oil alkyd resins such, for example, as a 30% oil length coconut fatty acid modified glyceryl phthalate reacted to an acid value of <10 and used at 50% solids in xylene.

EXAMPLE 4

Phenoxy benzyl substituted Bisphenol-A formaldehyde resin (via methoxy methyl diphenyloxide)

(A) PREPARATION OF INTERMEDIATE, PHENOXY-BENZYL SUBSTITUTED BISPHENOL–A

Charge:
- 215 gms. (1 mol) methoxy methyl diphenyloxide
- 228 gms. (1 mol) Bisphenol-A The same general procedure and apparatus was used as in the preparation of phenoxy benzyl phenol via the methoxy methyl diphenyl-oxide route (Example 2–A). Total reaction time was approximately 2 hours. Flask temperatures ranged from 170° C. to 250° C. during evolution of methanol. The temperature at the top of the Vigreaux column ranged from 67° C. to 84° C. Thirty-one grams of methanol was recovered. The product is a dark brown resinous semisolid.

(B) PREPARATION OF PHENOLIC RESIN FROM PHENOXYBENZYL BISPHENOL–A

Charge:
- 410 gms. intermediate from above
- 63 gms. (2.10 mols) para $CH_2O$
- 0.8 gm. (0.02 mol) NaOH
- 30 gms. methanol
- 300 gms. toluene The phenolic resin was prepared following the procedure outlined in Example 3–B. The finished resin exhibited properties very similar to that prepared via the chloromethyldiphenyloxide route.

EXAMPLE 5

Phenoxy benzyl substituted mixed phenols and their formaldehyde condensation resins (via chloromethyldiphenyloxide route)

(A) PREPARATION OF INTERMEDIATE, PHENOXY-BENZYL SUBSTITUTED PHENOL, FLEXIPHEN 160 [1]

Charge:
- 219 gms. (1 mol) chloromethyldiphenyloxide
- 70.5 gms. (¾ mol) reagent grade phenol
- 87.5 gms. (¼ mol) Flexiphen 160

[1] Flexiphen 160 is a polymethylene polyphenol with a phenolic equivalent weight of 350, marketed by Koppers Co., Inc.

The apparatus and general procedure for reaction, removal of HCl and following the course of reaction is described in Example 1–A. In this case the CMDPO was added dropwise to the molten phenols at 75° C. during two hours. Reaction was continued with inert gas sparging according to the following schedule: 1 hour at 100°–150° C.; 6 hours at 150° C.; 1 hour at 150° C.–180° C.

By titration of the liberated HCl (absorbed in $2NK_2CO_3$ solution) it was determined that the reaction was 98.3% complete after the above schedule.

The product is a dark brown resinous semisolid.

(B) PREPARATION OF FORMALDEHYDE CONDENSATION RESIN FROM PHENOXYBENZYL PHENOL, FLEXIPHEN 160.

Charge:
- 341 gms. (about 1 mol) of intermediate from Example 5–A
- 31.5 gms. (1.05 mols) of para $CH_2O$
- 0.4 gm. NaOH
- 15 gms. methanol
- 200 gms. toluene The procedure and apparatus is the same as in Example 1–B. Reflux time was 1½ hours at 95°–100° C. Water was removed by azeotropic distillation, and finally toluene was removed until the batch temperature reached 175° C. At this point the viscous resin was cooled to 140° C. and fresh toluene was added as thinner.

The resulting filtered varnish gelled within 90 minutes when baked in an aluminum dish at 135° C. in a forced draft oven. It is compatible with short and medium oil length alkyd resins and epoxy ester varnishes, which act as desirable plasticizers. A typical medium oil length alkyd is a 52% oil length linseed fatty acid modified glyceryl phthalate reacted to an acid value <8 used at 60% solids in xylene. A medium oil length epoxy is, for example, a 40% oil length dehydrated castor fatty acid ester of a solid Bisphenol-A-epichlorohydrin condensation resin having an epoxy equivalent weight of about 875–1025.

EXAMPLE 6

Phenoxy benzyl substituted phenol, Flexiphen 160 formaldehyde condensation resin (via methoxy methyl diphenyloxide)

(A) PREPARATION OF INTERMEDIATE, PHENOXY-BENZYL PHENOL, FLEXIPHEN 160

Charge:
- 430 gms. (about 2 mol) methoxy methyl diphenyloxide
- 142 gms. (1.5 mol) reagent grade phenol
- 175 gms. (½ mol) Flexiphen 160

The apparatus and procedure used were essentially the same as in Example 2–A. Methanol was removed while the batch temperature was raised from 180° to 250° C. during the period of four hours. The temperature at the top of the Vigreaux fractionating column varied from 60° C. at the start to 82° C., when phenols began to distill. Total methanol recovered was 61.7 gms., equivalent to 96.4% completion of the reaction. The resultant product closely resembled that of Example 5–A.

(B) PREPARATION OF FORMALDEHYDE CONDENSATION RESIN FROM ABOVE INTERMEDIATE

Charge:
- 683 gms. (about 2 mol) of above intermediate Example 6–A
- 63 gms. (2.1 mol) para $CH_2O$
- 0.8 gm. (0.02 mol) NaOH
- 30 gms. methanol
- 450 gms. toluene The apparatus and procedure employed were similar to those of the preceding formaldehyde condensation resins such as Examples 1–B, 2–B, 3–B, 4–B, 5–B. Reflux time was 1½ hours at 90°–95° C. Final distillation of toluene was carried out to a batch temperature of 165° C., where the resin was quite viscous. After thinning with toluene the resin was filtered under vacuum to remove the insoluble crystalline material normally encountered in these resins.

The product was essentially the same as the corresponding resin made from chloromethyldiphenyloxide (Example 5–B).

EXAMPLE 7

Phenoxy benzyl substituted phenol-paratertiary butyl phenol formaldehyde condensation resin (via methoxy methyl diphenyl oxide)

(A) PREPARATION OF INTERMEDIATE

Charge:
    430 gms. (about 2 mol) methoxy methyl diphenyloxide
    225 gms. (1.5 mol) paratertiarybutyl phenol
    47 gms. (½ mol) phenol, reagent grade Apparatus and procedure were the same as Examples 2–A, 4–A, 6–A. Methanol was removed at batch temperatures ranging from 210° to 269° C. The reaction required 3 hours, and 54 grams of methanol was recovered.

(B) PREPARATION OF FORMALDEHYDE CONDENSATION RESIN FROM PHENOXY BENZYL SUBSTITUTED PHENOL-PARATERTIARYBUTYL PHENOL

Charge:
    590 gms. (about 2 mol) intermediate from above
    63 gms. (2.10 mol) paraformaldehyde
    0.8 gm. (0.02 mol) NaOH
    30 gms. methanol
    200 gms. toluene Apparatus and procedure were similar to preceding formaldehyde condensations (Examples 1–B, 2–B, 3–B, etc.). Reflux time was 1½ hours at 120° C. During azeotropic distillation, 41 ml. of water phase was removed. During final stripping of toluene 150 gms. of the solvent was removed, allowing the batch temperature to reach 170° C. After thinning with toluene and filtering, the resin solution was clear and orange colored.

This resin in baked films is compatible with medium oil alkyds, epoxy esters, maleinized linseed oil and alkali refined linseed oil. Maleinized linseed oil is the reaction product of alkali refined linseed oil 93% by weight, maleic anhydride 7% by weight, esterified with pentaerythritol to an acid value of about 2.

Baking speed is less than Example 6–B. Gel time in a forced draft oven is 120 minutes at 135° C.

EXAMPLE 8

Phenoxy benzyl substituted phenolparatertiarylbutyl phenol formaldehyde condensation resin (via methoxy methyl diphenyl oxide)

(A) PREPARATION OF INTERMEDIATE

Charge:
    430 gms. (about 2 mol) methoxy methyl diphenyl oxide
    150 gms. (1 mol) paratertiarybutyl phenol
    94 gms. (1 mol) phenol, reagent grade Apparatus and procedure were the same as Examples 2–A, 4–A, 6–A, 7–A. Methanol was removed at batch temperature ranging from 190° C. to 257° C. Reaction time was 3.5 hours yielding 54.3 gms. of methanol recovered.

(B) PREPARATION OF FORMALDEHYDE CONDENSATION RESIN FROM INTERMEDIATE 8–A

Charge:
    546 gms. (about 2 mol) intermediate 8–A
    64 gms. paraformaldehyde
    30 gms. methanol
    0.8 gm. (0.02 mol) NaOH
    200 gms. toluene Apparatus and procedure were similar to preceding formaldehyde condensation (Examples 1–B, 2–B, 3–B, etc.). Reflux time was 1.5 hours at 120° C. During azeotropic distillation, 40 ml. of water phase was separated. During final stripping of toluene, 150 gms. of this solvent was removed allowing the batch temperature to reach 165° C.

After final thinning with additional toluene and filtering, the product yield was 1000 gms. of clear solution at 57% solids.

This resin in baked films (1:1 solids) basis is compatible with a short oil alkyd and a medium oil length epoxy ester.

EXAMPLE 9

Phenoxy benzyl substituted paratertiarybutyl phenol formaldehyde condensation resin (via methoxy methyl diphenyl oxide)

(A) PREPARATION OF INTERMEDIATE

Charges:
    430 gms. (2 mol) methoxy methyl diphenyl oxide
    300 gms. (2 mol) paratertiarybutyl phenol Apparatus and procedure were the same as previous examples using the methoxy methyl diphenyl oxide route (Examples 2–A, 4–A, 6–A, 7–A, 8–A).

Methanol was removed at batch temperatures ranging from 205° C. to 280° C. Reaction time was three hours yielding 80 gms. of recovered methanol.

(B) PREPARATION OF FORMALDEHYDE CONDENSATION RESIN FROM INTERMEDIATE 9–A

Charge:
    696 gms. (about 2 mol) intermediate 9–A
    64 gms. (2.1 mol) paraformaldehyde
    0.8 gms. (0.02 mol) NaOH
    30 gms. methanol
    200 gms. toluene Apparatus and procedure were similar to preceding formaldehyde condensation reactions (Examples 1–A, 2–B, 3–B etc.). Reflux period was 1.5 hours. Water was separated by azeotropic distillation. Final stripping of toluene was carried out to remove 150 gms. of the solvent to a batch temperature of 170° C.

Toluene was replaced to yield 1100 gms. of a dark, clear resin solution at 60% solids.

In baked films (1:1) solids basis, this resin is compatible with the following plasticizing resins: short oil alkyd, medium oil alkyd, medium oil epoxy ester and maleinized linseed oil.

EXAMPLE 10

Phenoxy benzyl substituted meta, para cresol-Flexiphen 160-formaldehyde condensation resin (via monochloromethyl diphenyl oxide.)

(A) PREPARATION OF INTERMEDIATE

Charge:
    438 gms. (2 mol) monochloromethyl diphenyl oxide
    164 gms. (1.5 mol) resin grade cresylic acid (50% meta, para content, 8% combined phenol and ortho cresol content)
    175 gms. (.5 mol) Flexiphen 160

Apparatus and procedure were the same as used in Examples 1–A, 3–A, etc. Total reaction time was 12 hrs. During this period, the temperature was gradually raised from 75° C. to 180° C. By-product HCl was absorbed in $K_2CO_3$ solution in Examples 1–A, 3–A, etc., initial reaction was 90% completed. The product was diluted to 50% solids with toluene.

(B) PREPARATION OF PHENOLIC RESIN FROM INTERMEDIATE 10–A

Charge:
    1405 gms. (2 mol) of 50% solution in toluene of intermediate 10–A
    66.0 gms. (2.2 mol) paraformaldehyde
    1.60 gms. (0.04 mol) NaOH
    30.0 gms. methanol Apparatus and procedure were the same as in case of previous formaldehyde condensations (Examples 1–A, 2–B, 3–B, etc.). Reflux period was 1.5 hours at 94° C. By azeotropic distillation, 30.4 gms. of water was recovered. Further stripping of the solvent was carried on until the batch temperature reached 140° C. At this point, the resin solution appeared quite viscous and further concentration was abandoned. Toluene was replaced to adjust final solids to approximately 50%.

This resin is compatible in baked films on 1:1 solids basis with the short oil alkyd, the medium oil alkyd and the medium oil epoxy ester. Gel times of the plasticized varnishes ranged from 50 minutes to 1.5 hours at 150° C.

EXAMPLE 11

Phenoxy benzyl substituted nonyl phenol-Flexiphen 160-formaldehyde condensation resin (via monochloromethyl diphenyl oxide).

(A) PREPARATION OF INTERMEDIATE

Charge:
  438 gms. (2 mol) monochloromethyl diphenyl oxide
  173 gms. (1.5 mol) nonyl phenol
  175 gms. (0.5 mol) Flexiphen 160

Apparatus and procedure were the same as in similar preparations of intermediate Examples 1–A, 3–A, 10–A, etc. Reaction time was 29 hours. During this period, the batch temperature slowly rose from 100° to 170° C. By titration of the absorbed by-product HCl, the reaction was 90% complete. The product was a dark, viscous semi-solid.

(B) PREPARATION OF FORMALDEHYDE CONDENSATION RESIN FROM INTERMEDIATE 11–A

Charge:
  886 gms. (about 2 mol of intermediate 11–A
  66 gms. (2.2 mol) paraformaldehyde
  1.6 gms. (0.05 mol) NaOH
  30 gms. methanol
  700 gms. toluene Apparatus and procedure were same as in cases of previous formaldehyde condensation reactions (Examples 1–B, 2–B 3–B, etc.). Reflux period was 1.5 hours, at 92° C. Water removed by azeotropic distillation was 39 gms. The resin was concentrated by stripping off 430 gms. of toluene leaving a viscous dark resin in the flask. This resin was thinned to 50% solids with fresh toluene and filtered.

When made up with the various plasticizers previously used in a 1:1 solids basis, the resin 11–B gave clear films and was judged to be compatible with the short oil alkyd, medium oil alkyd, medium oil epoxy and maleinized linseed oil. Cure times were in excess of five hours at 150° C.

TEST RESULTS (A) Thermal and electrical tests

Several thermosetting insulating varnishes were prepared from the examples listed above. These were coated on twisted pairs of enameled wires according to AIEE Test Procedure No 57 and aged at various temperatures in forced draft ovens to dielectric failure according to the No. 57 test procedure.

The following tabulation indicates the compositions and their performance.

| Composition | Type | Hours to fail at— | | | | |
|---|---|---|---|---|---|---|
| | | 325° C. | 300° C. | 275° C. | 250° C. | 225° C. |
| Ex. 1–B | Hard, high bond strength. | 193 | 410 | 1,754 | 4,300 | 6,000 |
| Ex. 3–B | do | 173 | 410 | 1,410 | 6,000 | >5,000 |
| 1:1 by wt. Ex. 5–B plus epoxy ester. | Flexible | 219 | 340 | 2,006 | 4,600 | 6,000 |

NOTE.—>5,000 indicates test still running.

(B) Resistance to solvent, transformer oil and alkali

Samples of both rigid and plasticized diphenyloxide modified phenolic varnishes were tested for resistance to toluene, transformer oil and 10% aqueous NaOH. For the sake of comparison samples of a well known Class F alkyd-phenolic varnish, silicone varnish, and an epoxy ester-urea formaldehyde varnish were included. All samples were prepared by curing 10 grams of the varnish for 16 hours at 135° C. in an aluminum dish. The cured cakes were separated from the aluminum dishes and cut into quarter sections which were immersed in the three separate test solutions. The fourth piece was retained for comparison.

The results are summarized in the following tabulation.

TABLE II

| | Resistance rating (1-excellent to 5-poor) | | |
|---|---|---|---|
| Description | Toluene at 25° C. | WEMCO C Oil, 48 hrs. at 105° C. | 10% aqueous NaOH, 336 hrs. at 25° C |
| Unmodified DO-phenolic | ¹1 | 1 | 1 |
| Do | ¹1 | 1 | 1 |
| Plasticized DO-phenolic | 3 | 2 | 2 |
| Silicone | 5 | 5 | 3 |
| Alkyd-phenolic | 4 | 2 | 4 |
| Epoxy ester-urea formaldehyde | 3 | 2 | 2 |

¹ Also unaffected by boiling toluene.

From the foregoing description of the invention, it will be apparent that the novel insulating resinous compositions afford to the industry a class of outstanding and greatly improved electrical insulation systems. The novel resinous compositions are thermally stable and range from hard, rigid types to soft, flexible materials. They are therefore applicable over the entire range of high temperature electrical insulating use.

I claim as my invention:

1. A resinous composition comprising the product obtained by first reacting (A) one mol of a monomeric diphenyl oxide having the general formula:

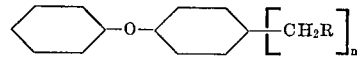

where $n$ has an average value of about 1 and R is an alkoxy radical having 1–4 carbon atoms, and (B) one mol of a reactant selected from the group consisting of phenol and substituted phenols, said reaction being carried out at about 75°–250° C., and second, reacting the intermediate so obtained with (C) a stoichiometric excess of a formaldehyde for each phenol moiety of the intermediate.

2. The resinous composition of claim 1 wherein R is the methoxy radical.

3. The resinous composition of claim 1 wherein the reactant (B) is phenol.

4. The resinous composition of claim 1 wherein the reactant (B) is 2,2-bis-(4-hydroxyphenyl) propane.

5. The resinous composition of claim 1 wherein the reactant (B) is p-tert-butyl phenol.

6. The resinous composition of claim 1 wherein the reactant (B) is a mixture of phenol and a polymethylene polyphenol.

7. The resinous composition of claim 1 wherein the reaction (B) is a mixture of p-tert-butyl phenol and phenol.

8. The resinous composition of claim 1 wherein the reactant (B) is a mixture of cresylic acid and a polymethylene polyphenol.

9. The resinous composition of claim 1 wherein the reactant (B) is a mixture of nonyl phenol and a polymethylene polyphenol.

10. The resinous composition of claim 4 wherein said short oil alkyd is a 30% oil length coconut fatty acid modified glyceryl phthalate reacted to an acid value less than 10.

11. The resinous composition of claim 5 blended with about 1 to 3 parts, by weight, maleinized linseed oil.

12. The resinous composition of claim 6 wherein the epoxy ester is a 40% oil length dehydrated castor fatty acid ester of a solid epoxy resin having an epoxy equivalent weight of 875–1025.

13. The resinous composition of claim 7 blended with about 1 to 3 parts, by weight, of a modifier selected from the group consisting of maleinized linseed oil and alkali refined linseed oil.

14. The resinous composition of claim 9 blended with about 1 to 3 parts, by weight, of maleinized linseed oil.

References Cited

UNITED STATES PATENTS

| Re. 25,213 | 7/1962 | Runk et al. |
| 3,316,140 | 4/1967 | Sonnabend. |

FOREIGN PATENTS

| 562,955 | 9/1958 | Canada. |
| 1,094,899 | 12/1960 | Germany. |

DONALD E. CZAJA, Primary Examiner

W. E. PARKER, Assistant Examiner

U.S. Cl. X.R.

117—128.4, 16.1; 260—19, 33.2, 33.6, 52, 61, 83.1